(12) United States Patent
Zhang et al.

(10) Patent No.: US 10,747,503 B2
(45) Date of Patent: *Aug. 18, 2020

(54) RANDOM NUMBER GENERATION USING HEAT ASSISTED MAGNETIC RECORDING

(71) Applicant: Seagate Technology LLC, Cupertino, CA (US)

(72) Inventors: Li Hong Zhang, Singapore (SG); WenXiang Xie, Singapore (SG); Xiong Liu, Singapore (SG)

(73) Assignee: Seagate Technology LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/589,660

(22) Filed: Oct. 1, 2019

(65) Prior Publication Data

US 2020/0034118 A1 Jan. 30, 2020

Related U.S. Application Data

(63) Continuation of application No. 15/884,952, filed on Jan. 31, 2018, now Pat. No. 10,481,873.

(51) Int. Cl.
*G06F 7/58* (2006.01)
*G11B 7/13* (2012.01)

(52) U.S. Cl.
CPC ............... *G06F 7/588* (2013.01); *G11B 7/13* (2013.01)

(58) Field of Classification Search
CPC ...................................................... G06F 7/588
See application file for complete search history.

(56) References Cited

U.S. PATENT DOCUMENTS

| | | | |
|---|---|---|---|
| 6,539,410 B1 * | 3/2003 | Klass | G06F 7/588 708/255 |
| 7,167,882 B2 | 1/2007 | Xie et al. | |
| 8,941,944 B1 * | 1/2015 | Dai | G11B 5/012 360/31 |
| 10,481,873 B2 * | 11/2019 | Zhang | G11B 7/13 |
| 2004/0139132 A1 | 7/2004 | Lutkenhaus | |
| 2010/0217789 A1 | 8/2010 | Saiton | |
| 2014/0119164 A1 | 5/2014 | Wilson et al. | |
| 2015/0199177 A1 | 7/2015 | Braganca | |
| 2019/0235840 A1 * | 8/2019 | Zhang | G11B 7/13 |

* cited by examiner

*Primary Examiner* — Chuong D Ngo
(74) *Attorney, Agent, or Firm* — Hall Estill Attorneys at Law

(57) ABSTRACT

A method includes detecting noise in a laser output of a heat assisted magnetic recording device. The noise is converted into an electrical signal including a numerical value. A least significant digit of the numerical value is selected. The least significant digit is concatenated with another least significant digit from another detecting of another noise in another laser output to form a number.

20 Claims, 11 Drawing Sheets

500

```
┌─────────────────────────────────────────────────────────┐
│  DETECTING NOISE IN A LASER OUTPUT OF A HEAT ASSISTED   │
│            MAGNETIC RECORDING DEVICE                    │
│                         502                             │
└─────────────────────────────────────────────────────────┘
                            │
┌─────────────────────────────────────────────────────────┐
│  CONVERTING THE NOISE INTO AN ELECTRICAL SIGNAL         │
│              INCLUDING A NUMERICAL VALUE                │
│                         504                             │
└─────────────────────────────────────────────────────────┘
                            │
┌─────────────────────────────────────────────────────────┐
│   SELECTING A LEAST SIGNIFICANT DIGIT OF THE NUMERICAL  │
│                         VALUE                           │
│                         506                             │
└─────────────────────────────────────────────────────────┘
                            │
┌─────────────────────────────────────────────────────────┐
│  CONCATENATING THE LEAST SIGNIFICANT DIGIT WITH ANOTHER │
│  LEAST SIGNIFICANT DIGIT FROM ANOTHER DETECTING OF      │
│  ANOTHER NOISE IN ANOTHER LASER OUTPUT TO FORM A NUMBER │
│                         508                             │
└─────────────────────────────────────────────────────────┘
```

```
┌─────────────────────────────────────────────────────────┐
│ DETECTING A PLURALITY OF LASER NOISES IN A HEAT ASSISTED │
│           MAGNETIC RECORDING DEVICE                      │
│                         602                              │
└─────────────────────────────────────────────────────────┘
                            │
┌─────────────────────────────────────────────────────────┐
│ CONVERTING THE PLURALITY OF LASER NOISES INTO A PLURALITY│
│                OF NUMERICAL VALUES                       │
│                         604                              │
└─────────────────────────────────────────────────────────┘
                            │
┌─────────────────────────────────────────────────────────┐
│ SELECTING A BIT IN EACH NUMERICAL VALUE OF THE PLURALITY │
│                OF NUMERICAL VALUES                       │
│                         606                              │
└─────────────────────────────────────────────────────────┘
                            │
┌─────────────────────────────────────────────────────────┐
│ CONCATENATING THE SELECTED BITS TO FORM A PLURALITY OF   │
│                      NUMBERS                             │
│                         608                              │
└─────────────────────────────────────────────────────────┘
```

FIG. 6

RANDOM NUMBER GENERATION USING HEAT ASSISTED MAGNETIC RECORDING

RELATED APPLICATION

The present application is a continuation of co-pending U.S. patent application Ser. No. 15/884,952 filed Jan. 31, 2018.

SUMMARY

Provided herein is a method including detecting noise in a laser output of a heat assisted magnetic recording (HAMR) device. The noise is converted into an electrical signal including a numerical value. A least significant digit of the numerical value is selected. The least significant digit is concatenated with another least significant digit from another detecting of another noise in another laser output to form a number. These and other features and advantages will be apparent from a reading of the following detailed description.

BRIEF DESCRIPTION OF THE DRAWINGS

FIG. 5 shows an exemplary flow diagram for generating a random number according to one aspect of the present embodiments.

FIG. 6 shows another exemplary flow diagram for generating random numbers according to one aspect of the present embodiments.

DESCRIPTION

Figure 1:
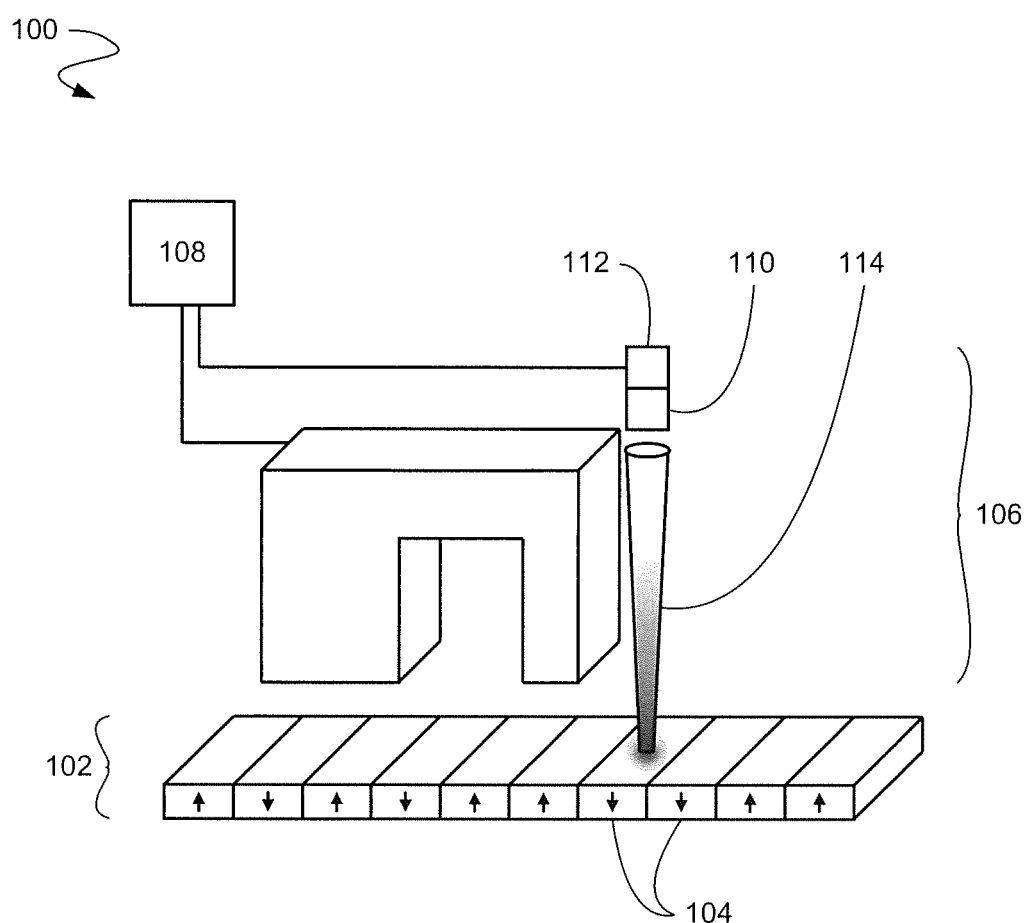
FIG. 1 shows a portion of a HAMR drive according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Hard disk drives (HDDs) have a wide range of applications in consumer electronics. As the technology of HDDs continues to improve, particularly in their functional and storage capabilities, the need for robust security systems to protect the information contained in HDDs also increases. Without a good security system, confidential and personal information may be retrieved by others and misused.

In order to improve security, security systems may use secret quantities such as authentication factors, passwords, cryptographic keys, etc. Such security systems may also use the generation of secret, unguessable, and unpredictable numbers (e.g. random numbers) in order to enhance integrity of the system. However, the generation of truly random numbers can be difficult. Pseudo-random number generators may be used to improve security, however such pseudo-random number generators result in pseudo-security. Therefore, security increases as the randomness of generated numbers increases. Embodiments described herein address these concerns by using components of heat assisted magnetic recording (HAMR) HDDs to generate random numbers.

The electromechanical nature of HDDs results in a number of noise generating components. In various embodiments described herein, the noise generated by a HAMR laser may be used as a source to increase the randomness of random number generators. The increased randomness moves random number generators away from pseudo-random number generators, thereby becoming more like true random number generators. As a result, in the embodiments described herein the random number generation provides greatly increased security.

Referring now to FIG. 1, a portion of a HAMR drive 100 is shown according to one aspect of the present embodiments. A media 102 (e.g. a hard drive disk) includes a number of magnetic recording zones 104 (e.g. magnetic bits) for recording and storing information. A head 106 reads information from the media 102 by detecting the magnetization of the magnetic recording zones 104. The head 106 writes information to the media 102 by changing the magnetization of the recording zones 104. The head 106 is coupled to a processor 108, which controls the functions of the head 106. In various embodiments, the head 106 may be directly coupled to the processor 108, or the head 106 may be coupled to the processor 108 through other components between the head 106 and the processor 108. For clarity of illustration, many components of the hard drive 100 are not shown, but are understood to be present.

In HAMR drives 100, it is difficult to change the magnetization of the recording zones 104 at room temperature. Therefore, the head 106 includes a laser 110 and a photodetector 112 (e.g. photodiode, phototransistor, photon multiplier, photo-resistor, etc.). During write operations of the HAMR drive 100, the laser 110 emits a beam 114 (e.g. laser output) that selectively heats one or more of the magnetic recording zones 104. As a result of the increased temperature, it is easier for the head 106 to change the magnetization of the heated magnetic recording zones 104. The photodetector 112 provides information to the processor 108 for controlling the operation (e.g. strength, duration, etc.) of the laser 110. As such, the laser 110 may be turned on and off many times during one or more write operations, and the processor 108 may adjust the laser 110 many times during the one or more write operations.

According to embodiments described herein, that the output signal of the laser 110 includes noise which has random fluctuations of intensity (e.g. amplitude) and phase. The photodetector 112 is a sensor (e.g. photodiode, phototransistor, photon multiplier, photo-resistor, etc.) that can detect the output of the laser 110, including the noise. In some embodiments the photodetector 112 is a laser power level sensor that detects the emitting light of the laser 110 and produces current which carries random distributed and quantized noise. In such embodiments, the laser power level sensor has a wide noise bandwidth up to a few to 10 MHz, which is used as a random source generator.

In various embodiments, the photodetector 112 (or other component, such as the processor 108, analog circuit/device, etc. in the HAMR drive 100) converts the detected output of the laser 110, including the noise, into an electrical signal. For example, the photodetector 112 may measure the output of the laser 110 during the writing process of the HAMR drive 100 while the head 106 remains over the media 102. However, it is understood that the photodetector 112 may measure the laser output in a variety of drive processes. In a non-limiting example, during a read process the laser 110 may be turned on at an intensity or duration that does not affect the media 102, but is sufficient to generate noise. As such, it is understood that the laser power used for random number generation may be different from that used for actual write operations, and the parameter setting of the electrical circuit (gain, filter, cut-off frequency, etc.) for this purpose may also be different and more suitable to random number generation.

In a further non-limiting example, the laser 110 may be turned on while the head 106 is parked on a ramp (not shown). In some embodiments, the random number is collected only when needed. In various embodiments, the random number collection may be carried out during the read and/or write operations. In further embodiments, the random number collection may also be performed on special designated reserve tracks on the media 102 with the laser 110 turned on. In some embodiments, only the noise is detected by the photodetector 112 and converted into the electrical signal. The electrical signal includes a numerical value, which is used in further processing (described below) to generate a random number.

As the HAMR drive 100 continues to operate, the laser 110 continues to create a number of outputs with a number of noises that are detected by the photodetector 112. As a result, the outputs and noises are converted into a number of electrical signals. Each of the electrical signals include a numerical value, and the numerical values are used to generate one or more random numbers. In some embodiments, the noise is isolated from other information in the detected output of the laser 110. In such embodiments, the noise may be isolated before or after the outputs are converted into electrical signals. It is understood that each one of the outputs, noises, electrical signals, and numerical values may be the same or different as other outputs, noises, electrical signals, and numerical values.

In various embodiments, the output of the photodetector 112 is filtered off of direct current (DC) components of the HAMR drive 100 and contains the alternating current (AC) component only. In such embodiments, the electrical signals are the AC signals that are then used to generate random numbers. The AC signal can be in amplitude or frequency which contain the mixed noises from different sources such as quantum noises, environment noise, electrical circuit noise, thermal noise, etc., used in the generation of hard to break random numbers.

Referring now to FIGS. 2A-2H, an exemplary generation of a random number using numerical values in electrical signals is shown according to one aspect of the present embodiments. As discussed above, detected outputs including noise of the laser are converted into electrical signals containing numerical values. The numerical values are then used to form a random number 218 or a variety of random numbers.

Figure 2A:
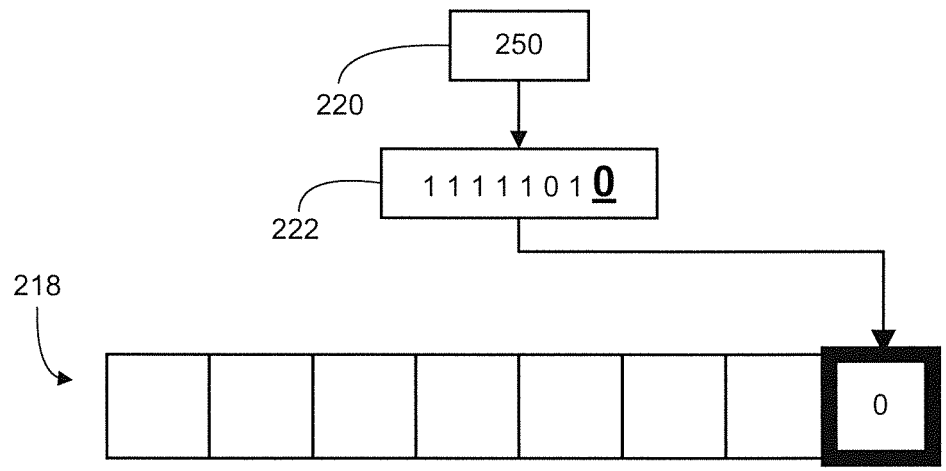
FIGS. 2A-2H show an exemplary generation of a random number using numerical values in electrical signals according to one aspect of the present embodiments.

For example, in FIG. 2A a first electrical signal includes an initial numerical value 220. In some embodiments, the initial numerical value 220 may then be converted to a subsequent numerical value 222. For example, the initial numerical value 220 may be a decimal value of "250". The initial numerical value 220 may then be converted to the subsequent numerical value 222 that is an equivalent binary value of "11111010". It is understood that the values are merely exemplary and any value may be used. In addition, it is understood that various embodiments may use any number system (e.g. decimal, binary, octal, hexadecimal, etc.) and may or may not convert the initial numerical value 220 to the subsequent numerical value 222.

A digit of the subsequent numerical value 222 is then selected and used to form a portion of the random number 218. For example, in the illustrated example the least significant bit of "0" (indicated by the bold and underlined emphasis in the FIG. 2A) is selected as the first bit of a byte that is becoming the random number 218. Likewise, it is understood that in the case of non-binary embodiments, a least significant digit is also used to generate other random number systems (e.g. decimal, binary, octal, hexadecimal, etc.).

Figure 2B:
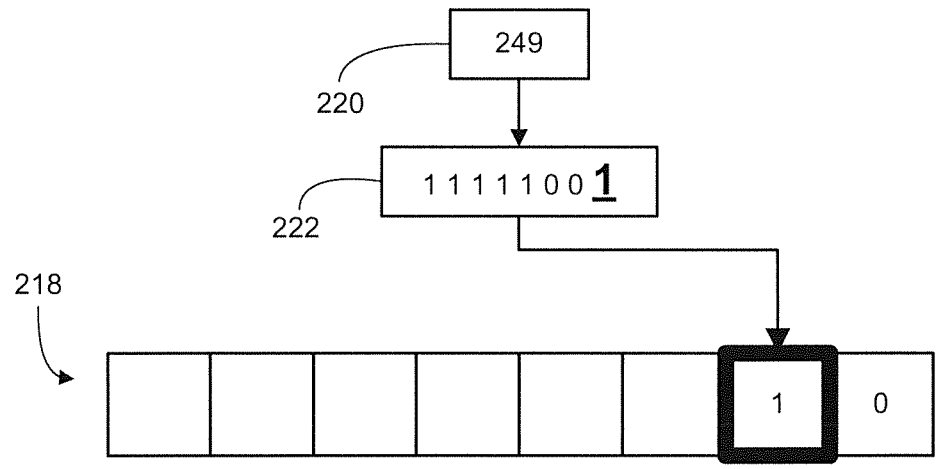
Figure 2C:
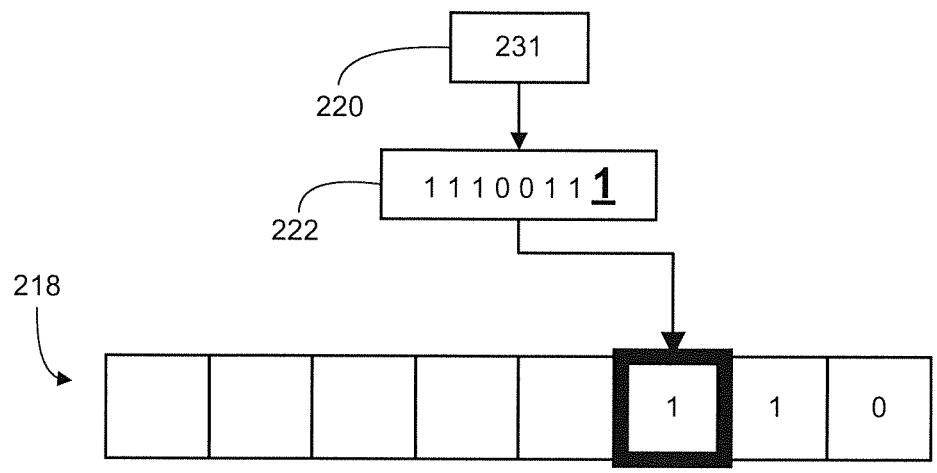
Figure 2D:
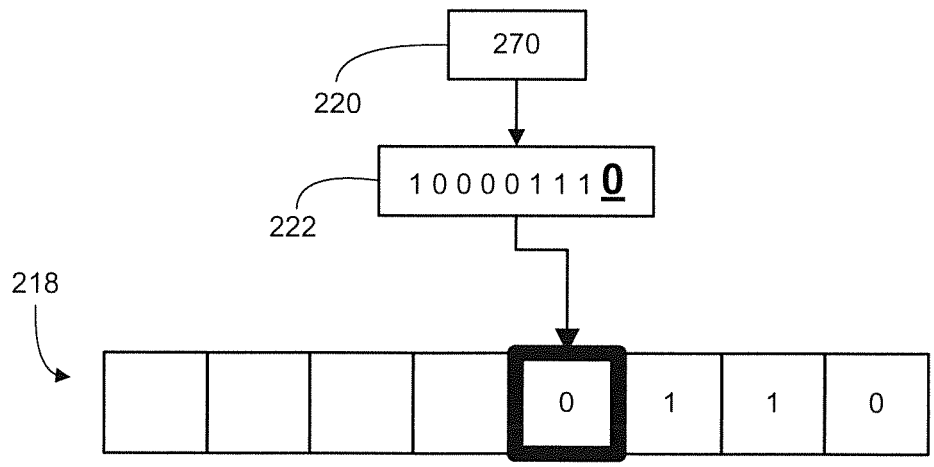
Figure 2E:
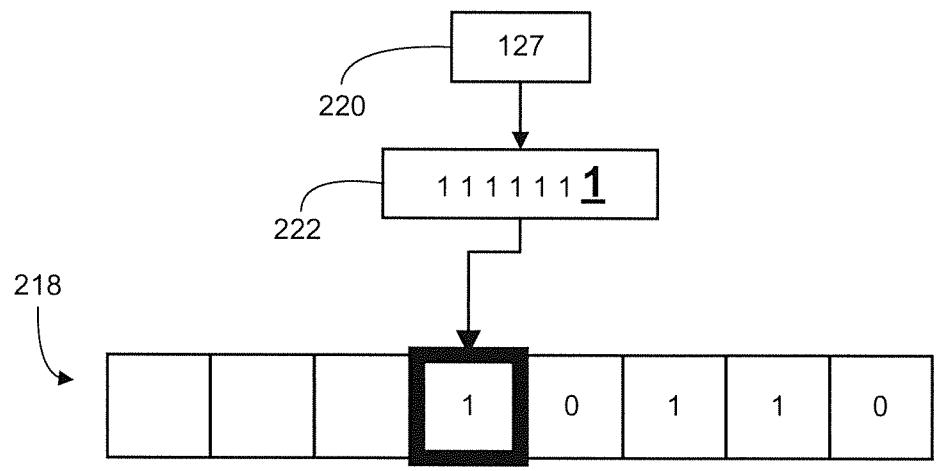
Figure 2F:
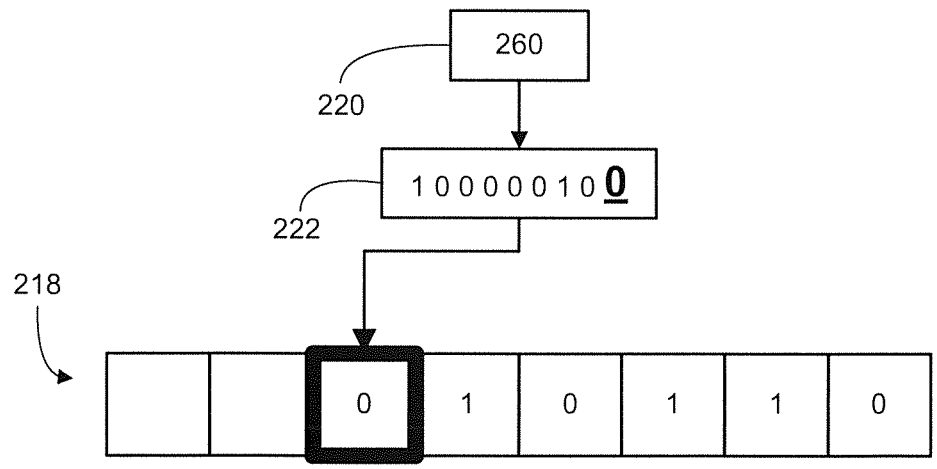
Figure 2G:
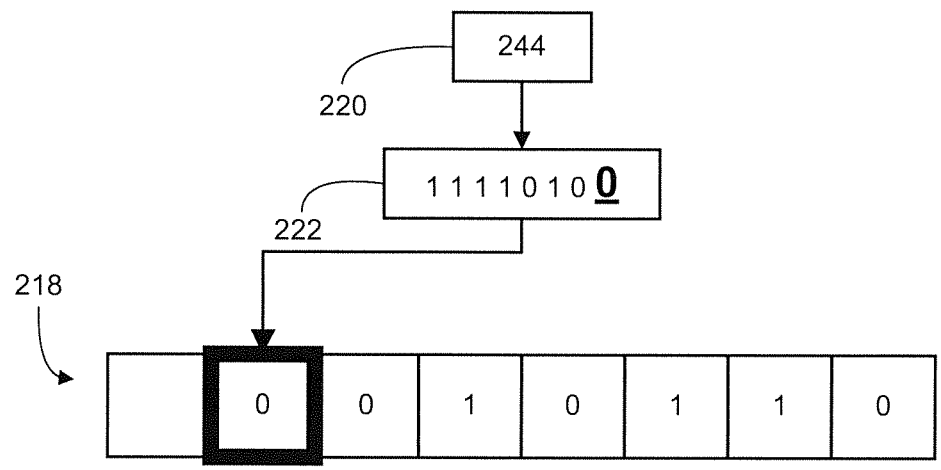
Figure 2H:
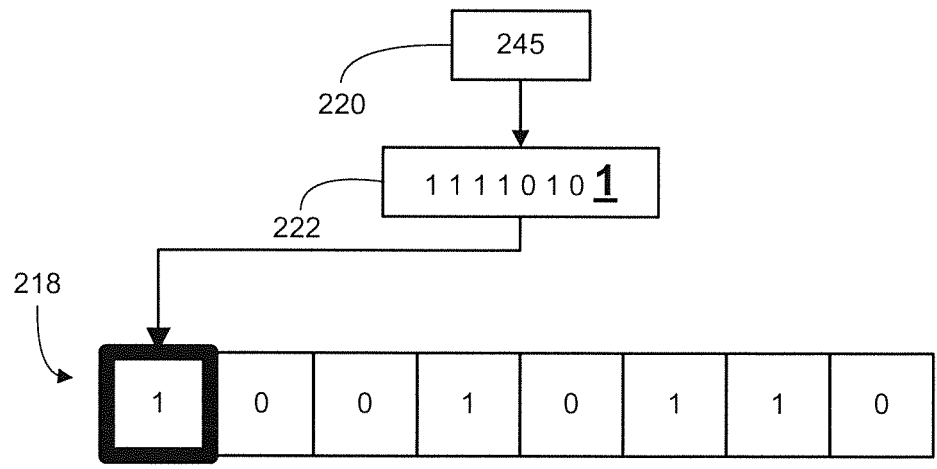

FIG. 2B continues the non-limiting example of the generation of the random number 218. In FIG. 2B another least significant bit "1" from another detecting of another laser output including another noise is concatenated (e.g. combined) with the FIG. 2A least significant bit to form the second bit of the random number 218.

FIGS. 2C through 2H further continue the non-limiting example of the generation of the random number 218. As a result, a number of laser outputs including a number of laser noises are converted into electrical signals and a number of numerical values. A bit in each of the numerical values is selected and concatenated to form the random number 218. In various embodiments, the generation and combining of bits may continue, thereby forming a number of random numbers.

Figure 3:
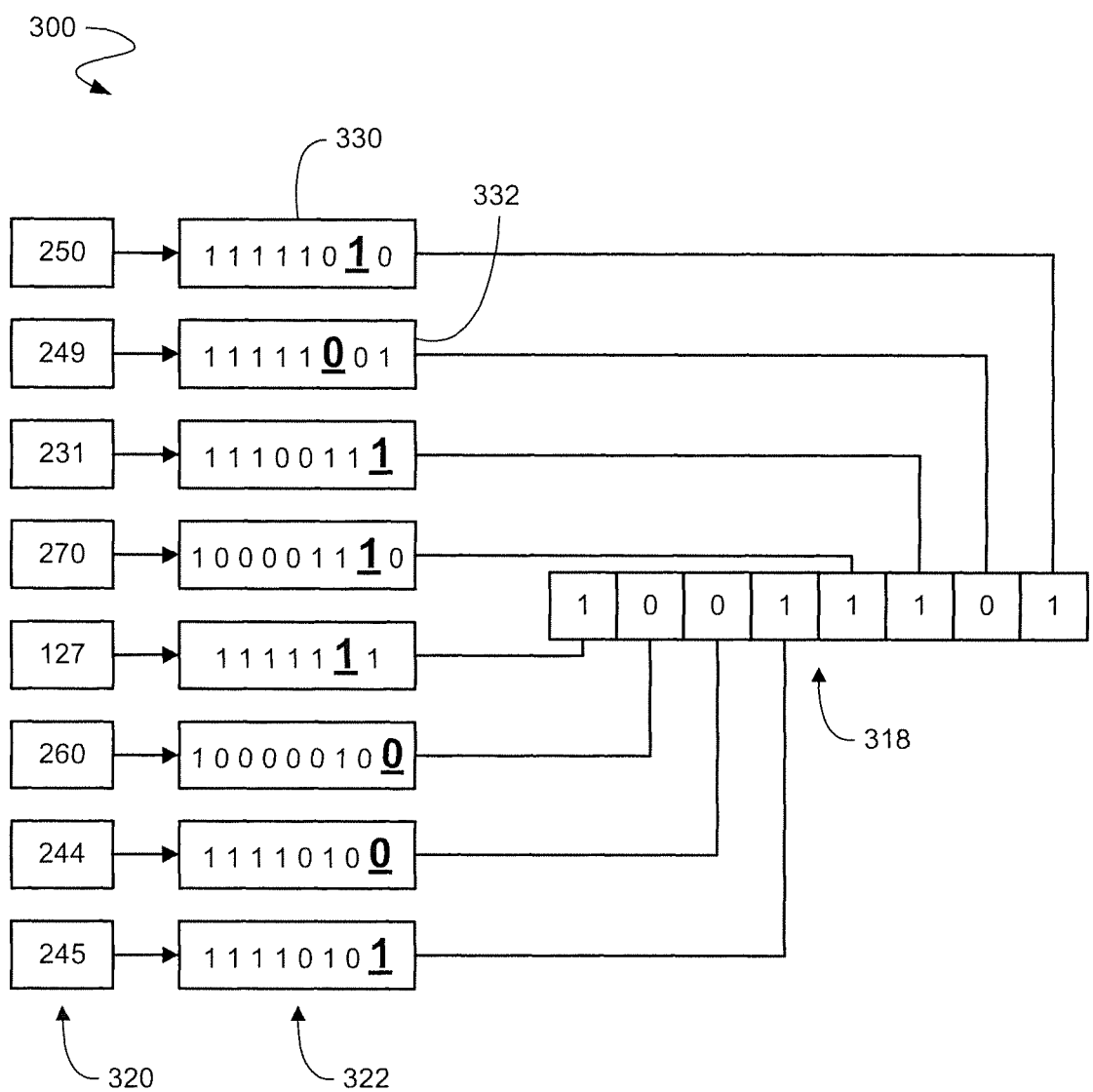
FIG. 3 shows an exemplary generation of another random number according to one aspect of the present embodiments.

Referring now to FIG. 3, an exemplary generation 300 of another random number is shown according to one aspect of the present embodiments. As previously discussed, digits from numerical values 322 generated from laser related values 320 including noise are combined to create one or more random numbers 318. It is understood that selecting the least significant digit (e.g. least significant bit) increases the randomness of the random number 318. However, further embodiments may include digits that are different from the least significant digit. As such, in the illustrated embodiment of FIG. 3, bits from different bit orders are selected to form the random number 318. For example, a first selected bit is selected from a first numerical value 330, and a second selected bit is selected from a second numerical value 332 in a different bit order than the first selected bit. As a result, the random number 318 is a combination of bits from different bit orders. In various embodiments, some or none of the selected bits may be least significant bits.

Also as illustrated in FIG. 3, various embodiments may concatenate the selected bits in an order that is independent of the detection of the laser related values 320 and/or the generation of the digits from the numerical values 322. As such, FIG. 3 shows an embodiment wherein the selected bits are in a sequence that is independent of the detecting and generating. In the present embodiment the random number 318 is one or more binary numbers. However as previously discussed, further embodiments may generate one or more random numbers according to other random number systems (e.g. decimal, binary, octal, hexadecimal, etc.).

Figure 4A:
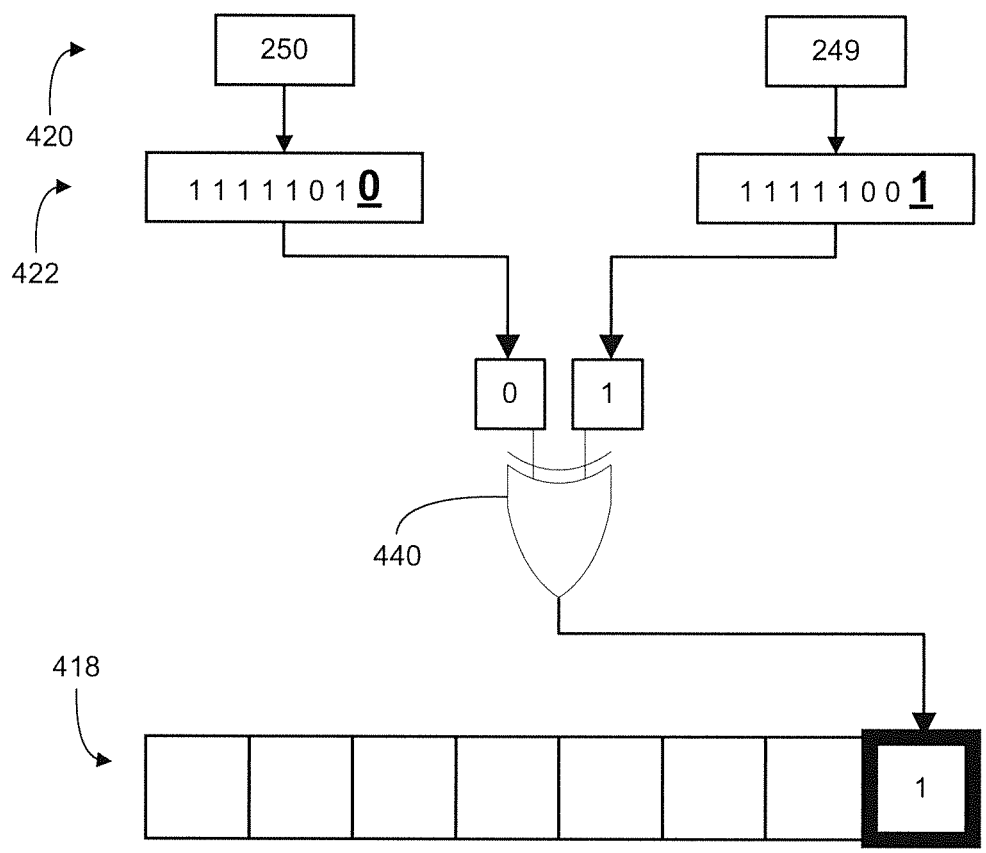
FIGS. 4A-4B show an exemplary generation of a random number using an XOR gate according to one aspect of the present embodiments.
Figure 4B:
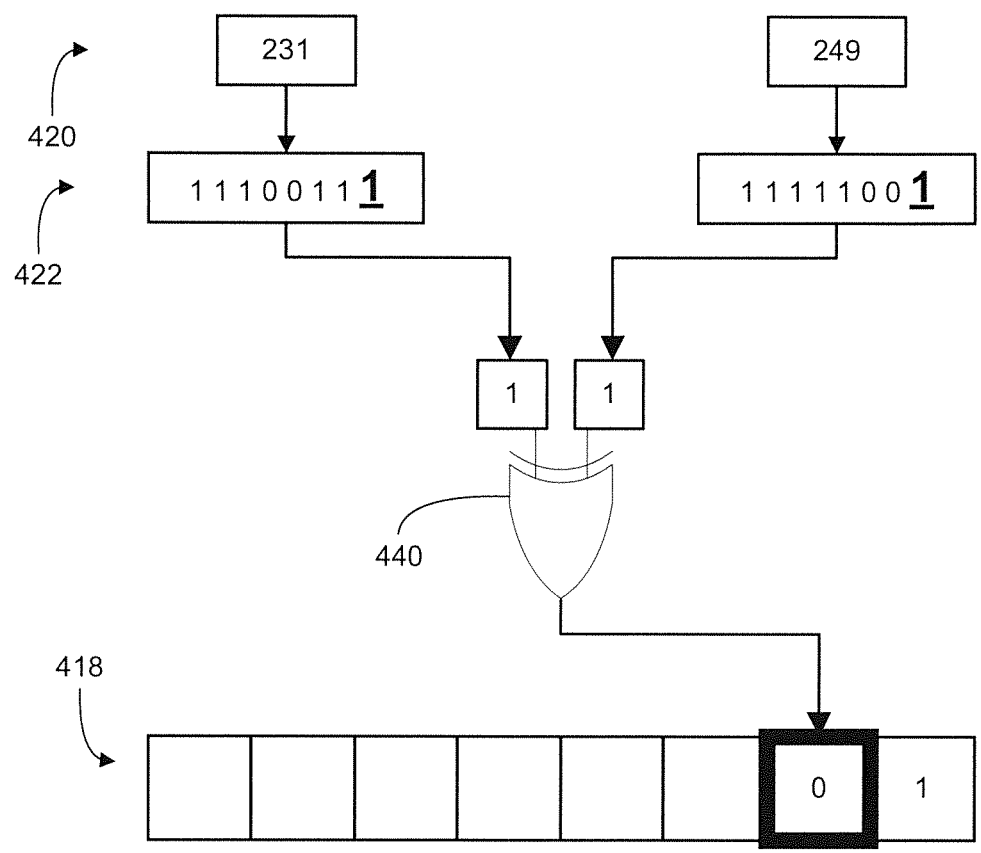

Referring now to FIGS. 4A-4B, an exemplary generation of a random number 418 using an XOR gate 440 is shown according to one aspect of the present embodiments. As previously discussed, digits from numerical values 422 generated from laser related values 420 including noise are combined to create one or more random numbers 418. In various embodiments, different elements may be used to alter the degree to which the generated number is random. For example, in the present embodiment the XOR gate 440 uses the numerical values from separate laser related values to create a single digit of the random number 418 in FIG. 4A. The XOR gate 440 then uses the numerical values from further laser related values to create another single digit to combine into the random number 418 in FIG. 4B. The process then continues until all of the digits of the random number 418 are generated (not shown).

It is understood that the XOR gate 440 is exemplary, and other components may be used (in addition to or instead of the XOR gate 440) to control the randomness of the random number 418. Furthermore, in various embodiments, the HAMR laser noise may be combined with other sources such as magnetoresistance (MR) noise, position-error signal (PES), etc. For example, MR noise and PES may be used as random number generators and combined through the XOR gate 440 (or other method) to further randomize the random number 418 and make it more unpredictable.

FIG. 5 shows an exemplary flow diagram 500 for generating a random number according to one aspect of the present embodiments. At block 502, a noise is detected from a laser output of a heat assisted magnetic recording device. At a block 504, the noise is converted into an electrical signal including a numerical value. At a block 506, a least significant digit of the numerical value is selected. At a block 508, the least significant digit is concatenated with another least significant digit from another detecting of another noise in another laser output to form a number.

FIG. 6 shows another exemplary flow diagram 600 for generating random numbers according to one aspect of the present embodiments. At block 602, a number of laser noises are detected in a heat assisted magnetic recording device. At a block 604, the number of noises are converted into a number of numerical values. At a block 606, a bit in each numerical value of the number of numerical values is selected. At a block 608, the selected bits are concatenated to form a number of numbers.

Figure 7:
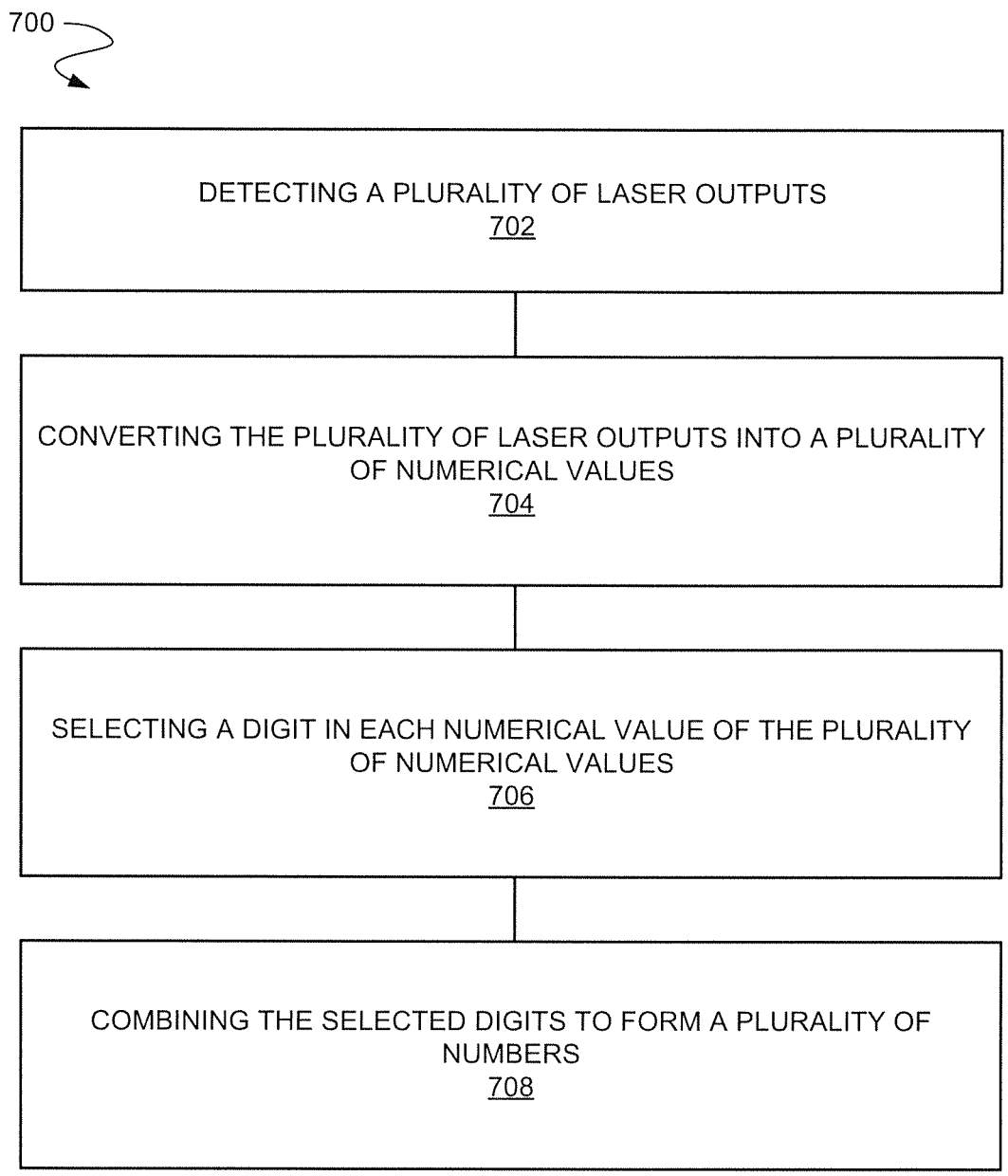
FIG. 7 shows a further exemplary flow diagram for generating random numbers to one aspect of the present embodiments.

FIG. 7 shows a further exemplary flow diagram 700 for generating random numbers according to one aspect of the present embodiments. At block 702, a number of laser outputs are detected. At a block 704, the number of laser outputs are converted into a number of numerical values. At a block 706, a digit is selected in each numerical value of the number of numerical values. At a block 708, the selected digits are combined to form a number of numbers.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A data storage device, comprising:
 a rotatable data storage medium;
 a heat assisted magnetic recording (HAMR) head assembly comprising a magnetic read sensor, a magnetic write element, a laser configured to emit electromagnetic radiation during a data write operation during which a magnetic pattern is written to the medium by the write element, and a photodetector configured to generate an output sense signal indicative of a power state of the laser; and
 a controller circuit configured to generate a random number responsive to a noise component of the output sense signal from the photodetector.

2. The data storage device of claim 1, wherein the controller circuit is further configured to use the random number as an input to a cryptographic process used to provide security for the data written to the medium.

3. The data storage device of claim 1, wherein the random number is generated during a write operation in which the laser emits sufficient electromagnetic radiation to lower a magnetic coercivity of a recording zone of the medium and the write element provides a time varying magnetic field to the recording zone.

4. The data storage device of claim 3, wherein the output sense signal from the photodetector is concurrently used by the controller circuit to adjust an intensity of the laser during the write operation.

5. The data storage device of claim 1, wherein the random number is generated during a read operation in which the magnetic read sensor reads a previously written pattern from a recording zone of the medium and the laser emits insufficient electromagnetic radiation to lower a magnetic coercivity of the recording zone.

6. The data storage device of claim 5, wherein the magnetic read sensor generates an output readback signal during the read operation, and wherein the controller circuit combines the output readback signal from the magnetic read sensor with the output sense signal from the photodetector to generate the random number.

7. The data storage device of claim 1, wherein the random number is generated while the head assembly is parked on a ramp structure adjacent the medium.

8. The data storage device of claim 1, further comprising a filter that removes a direct current (DC) component of the output signal and the random number is generated responsive to a remaining an alternating current (AC) component.

9. The data storage device of claim 1, wherein the output sense signal is an analog signal with a high frequency component, the data storage device further comprises an analog to digital converter circuit configured to generate a sequence of multi-bit digital values responsive to the analog signal, and wherein the controller circuit combines selected bits of the sequence of multi-bit digital values to generate the random number.

10. The data storage device of claim 9, wherein a selected bit from each of the sequence of multi-bit digital values are concatenated to form the random number.

11. The data storage device of claim 1, wherein the controller circuit further operates to convert the noise component of a selected portion of the output sense signal into a numerical value and generates the random number using a single selected bit from the numerical value.

12. The data storage device of claim 11, wherein the controller circuit further operates to convert the noise component of a second selected portion of the output sense signal into a second numerical value and further generates the random number using only a single selected bit from the second numerical value.

13. A hard disc drive (HDD), comprising:
a rotatable magnetic recording disc;
a head assembly controllably positionable adjacent the disc, the head assembly comprising a write element, a laser configured to apply a beam of electromagnetic radiation onto a location of the disc to lower a magnetic coercivity thereof sufficiently to enable a write element to write a magnetic pattern to the location, a read element configured to subsequently magnetically sense the magnetic pattern written by the write element, and a photodetector configured to monitor operation of the laser; and
a controller circuit configured to use an output sense signal from the photodetector to concurrently adjust an amplitude of the laser and to generate a random number.

14. The HDD of claim 13, wherein the controller circuit is further configured to use the random number as an input to a cryptographic process used to provide security for the data written to the medium.

15. The HDD of claim 13, wherein the controller circuit is further configured to use a second output sense signal from the photodetector during a read operation in which the read element reads data from the disc to generate a second random number.

16. The HDD of claim 15, wherein the controller circuit is further configured to combine the second output sense signal from the photodetector with a readback signal from the read element to generate a third random number.

17. The HDD of claim 13, wherein the output sense signal is an analog signal with a high frequency component, the data storage device further comprises an analog to digital converter circuit configured to generate a sequence of multi-bit digital values responsive to the analog signal, and wherein the controller circuit combines selected bits of the sequence of multi-bit digital values to generate the random number.

18. The HDD of claim 13, wherein the controller circuit further generates a position error signal (PES) to control the position of the head assembly with respect to the disc, the controller circuit further generating the random number by combining the output sense signal from the photodetector with the PES to generate the random number.

19. A method comprising:
rotating a magnetic recording disc at a selected rotational velocity;
using a head assembly controllably positionable adjacent the disc to write a magnetic pattern thereto using a write element that applies a magnetic pattern to the disc and a laser that irradiates the disc with a beam of electromagnetic radiation;
obtaining an output sensor signal from a photodetector adjacent the laser, the output sensor signal indicative of a power state of the laser and having a noise component;
using the output sensor signal to concurrently adjust a power level of the laser and to generate a random number.

20. The method of claim 19, further comprising using a random number as an input in a cryptographic function to encrypt data stored to the disc.

* * * * *